P. KOPFER.
COOLING AND SETTING TIRES.
No. 28,492.            Patented May 29, 1860.
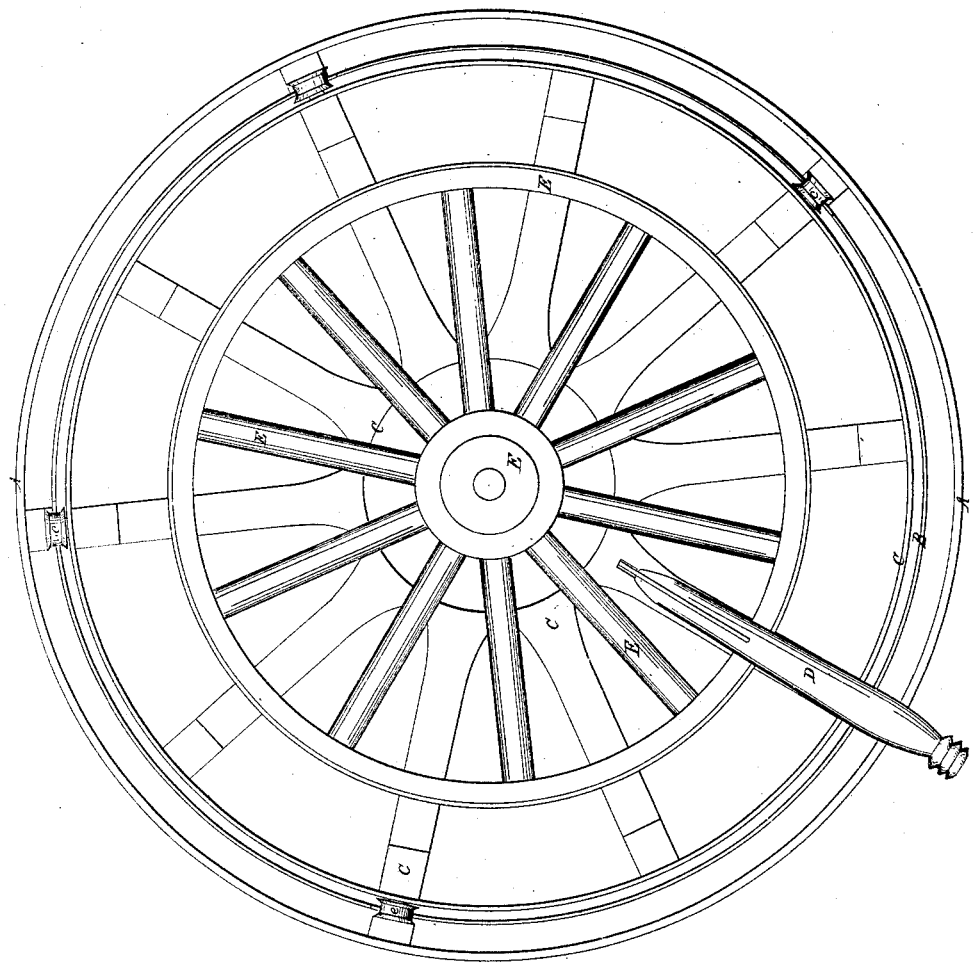
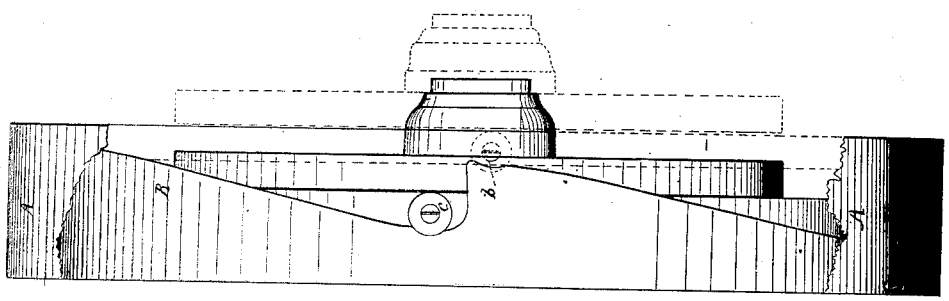
Witnesses
S. D. Stanchfield
Geo. Barnett
Inventor
Firmin Köpfer

UNITED STATES PATENT OFFICE.

PREMIN KÖPFER, OF FOND DU LAC, WISCONSIN.

COOLING AND SETTING TIRES.

Specification of Letters Patent No. 28,492, dated May 29, 1860.

*To all whom it may concern:*

Be it known that I, PREMIN KÖPFER, of Fond du Lac, in the county of Fond du Lac and State of Wisconsin, have invented a new and useful improvement in Machines for Setting and Cooling Tires; and I do hereby declare that the following is a full and exact description thereof, reference being had to the accompanying drawings and to the letters of reference marked thereon.

The object of my invention is the improvement of cisterns for cooling tires of wheels.

My invention consists of a circular cistern provided with a series of inclined planes or tracks in connection with a revolving platform running upon rollers.

In the accompanying drawings; Figure 1 is a top view of my machine with a wheel in place on the platform. Fig. 2 is a front elevation of the same, the side of the cistern being broken away better to show the operating parts.

A, Fig. 1, represents a cistern, which may be made of iron or of wood. Within this cistern is a track or road B, consisting of a series of inclined planes, as shown in Fig. 2. Resting upon the track or way is a revolving platform C, provided with a series of rollers, *c*, corresponding with the series of inclined planes in the track. This platform may be constructed of wooden radial arms, connected at their extremities by flat rings of iron and rivets or screws, as seen in Fig. 2. In the center of the platform there must be a hole for the reception of the hub of the wheel. By means of a lever D this platform can be made to revolve a certain distance and thus depress the platform into the cistern when the rollers *c*, Fig. 2, descend the inclined planes, or elevate the platform quite to the top of the cistern when the said rollers are made to ascend the inclined planes. In Fig. 2, the roller *c* and platform B are shown depressed in black lines and elevated in red.

Upon the revolving platform C, is represented a wheel E, Fig. 2, in position for setting the tire, the hub of the wheel being in the central aperture of the platform. In this position the wheel lies firmly upon the platform and the workmen can approach the wheel on every side in order to hammer on the tire, which hammering must be done with great expedition to prevent the heated iron from charring the fellies. While this operation is progressing, the rollers, *c*, of the platform, rest securely in depressions at the top of the inclined planes, as shown at *b*, Fig. 2. The moment the tire is driven into place upon the wheel, the platform is turned by means of lever D, so as to move the rollers out of the depressions *b*, when the platform and wheel roll down the inclined planes, at once immersing the hot tire in the water.

I am aware that cisterns for cooling tires are not new, therefore I do not broadly claim such invention, but confine my claim to the substantial improvements above described.

Having thus fully described my invention, what I claim and desire to secure by Letters Patent of the United States is—

The above described cistern and revolving platform, the former being provided with the series of inclined planes and the latter with a corresponding series of rollers, the whole being constructed arranged and operated substantially as set forth, for the purposes herein specified.

PREMIN KÖPFER.

In presence of—
S. D. STANCHFIELD,
GEO. BARNETT.